(12) United States Patent
Elshafie et al.

(10) Patent No.: US 12,355,691 B2
(45) Date of Patent: Jul. 8, 2025

(54) USER EQUIPMENT RELAYING USING MINI-SLOTS

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 479 days.

(21) Appl. No.: 17/933,545

(22) Filed: Sep. 20, 2022

(65) Prior Publication Data

US 2024/0097839 A1    Mar. 21, 2024

(51) Int. Cl.
*H04L 5/00* (2006.01)
*H04W 40/22* (2009.01)
*H04W 72/0446* (2023.01)

(52) U.S. Cl.
CPC ........... *H04L 5/0044* (2013.01); *H04W 40/22* (2013.01); *H04W 72/0446* (2013.01)

(58) Field of Classification Search
CPC .............. H04L 5/0044; H04W 40/22; H04W 72/0446; H04W 88/04; H04W 72/02
See application file for complete search history.

(56) References Cited

U.S. PATENT DOCUMENTS

| | | | |
|---|---|---|---|
| 8,265,647 B2* | 9/2012 | Kawasaki | H04W 72/542 455/39 |
| 10,856,166 B1* | 12/2020 | Marupaduga | H04W 24/10 |
| 11,876,573 B2* | 1/2024 | Luo | H04B 7/15535 |
| 2010/0067427 A1 | 3/2010 | Choudhury | |

FOREIGN PATENT DOCUMENTS

| | | | |
|---|---|---|---|
| EP | 2627137 A1 | 8/2013 | |
| EP | 3001579 A1 | 3/2016 | |

OTHER PUBLICATIONS

International Search Report and Written Opinion—PCT/US2023/072633—ISA/EPO—Nov. 27, 2023.

* cited by examiner

*Primary Examiner* — Tejis Daya
(74) *Attorney, Agent, or Firm* — Harrity & Harrity, LLP

(57) ABSTRACT

Various aspects of the present disclosure generally relate to wireless communication. In some aspects, a relay user equipment (UE) may receive a packet from a source node. The UE may identify a select mini-slot or a select sub-band for transmitting the packet based at least in part on a reference signal measurement that is indicated per mini-slot of a plurality of mini-slots or per sub-band of a plurality of sub-bands. The UE may transmit the packet to a destination node using the select mini-slot or the select sub-band. Numerous other aspects are described.

30 Claims, 12 Drawing Sheets

USER EQUIPMENT RELAYING USING MINI-SLOTS

FIELD OF THE DISCLOSURE

Aspects of the present disclosure generally relate to wireless communication and to techniques and apparatuses for user equipment relaying using mini-slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LIE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a relay user equipment (UE). The method may include receiving a packet from a source node. The method may include identifying a select mini-slot or a select sub-band for transmitting the packet based at least in part on a reference signal measurement that is indicated per mini-slot of a plurality of mini-slots or per sub-band of a plurality of sub-bands. The method may include transmitting the packet to a destination node using the select mini-slot or the select sub-band.

Some aspects described herein relate to an apparatus for wireless communication performed by a relay UE. The apparatus may include a memory and one or more processors, coupled to the memory. The one or more processors may be configured to receive a packet from a source node. The one or more processors may be configured to identify a select mini-slot or a select sub-band for transmitting the packet based at least in part on a reference signal measurement that is indicated per mini-slot of a plurality of mini-slots or per sub-band of a plurality of sub-bands. The one or more processors may be configured to transmit the packet to a destination node using the select mini-slot or the select sub-band.

Some aspects described herein relate to a non-transitory computer-readable medium that stores a set of instructions for wireless communication by a relay UE. The set of instructions, when executed by one or more processors of the UE, may cause the UE to receive a packet from a source node. The set of instructions, when executed by one or more processors of the UE, may cause the UE to identify a select mini-slot or a select sub-band for transmitting the packet based at least in part on a reference signal measurement that is indicated per mini-slot of a plurality of mini-slots or per sub-band of a plurality of sub-bands. The set of instructions, when executed by one or more processors of the UE, may cause the UE to transmit the packet to a destination node using the select mini-slot or the select sub-band.

Some aspects described herein relate to an apparatus for wireless communication. The apparatus may include means for receiving a packet from a source node. The apparatus may include means for identifying a select mini-slot or a select sub-band for transmitting the packet based at least in part on a reference signal measurement that is indicated per mini-slot of a plurality of mini-slots or per sub-band of a plurality of sub-bands. The apparatus may include means for transmitting the packet to a destination node using the select mini-slot or the select sub-band.

Aspects generally include a method, apparatus, system, computer program product, non-transitory computer-readable medium, user equipment, base station, network entity, network node, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
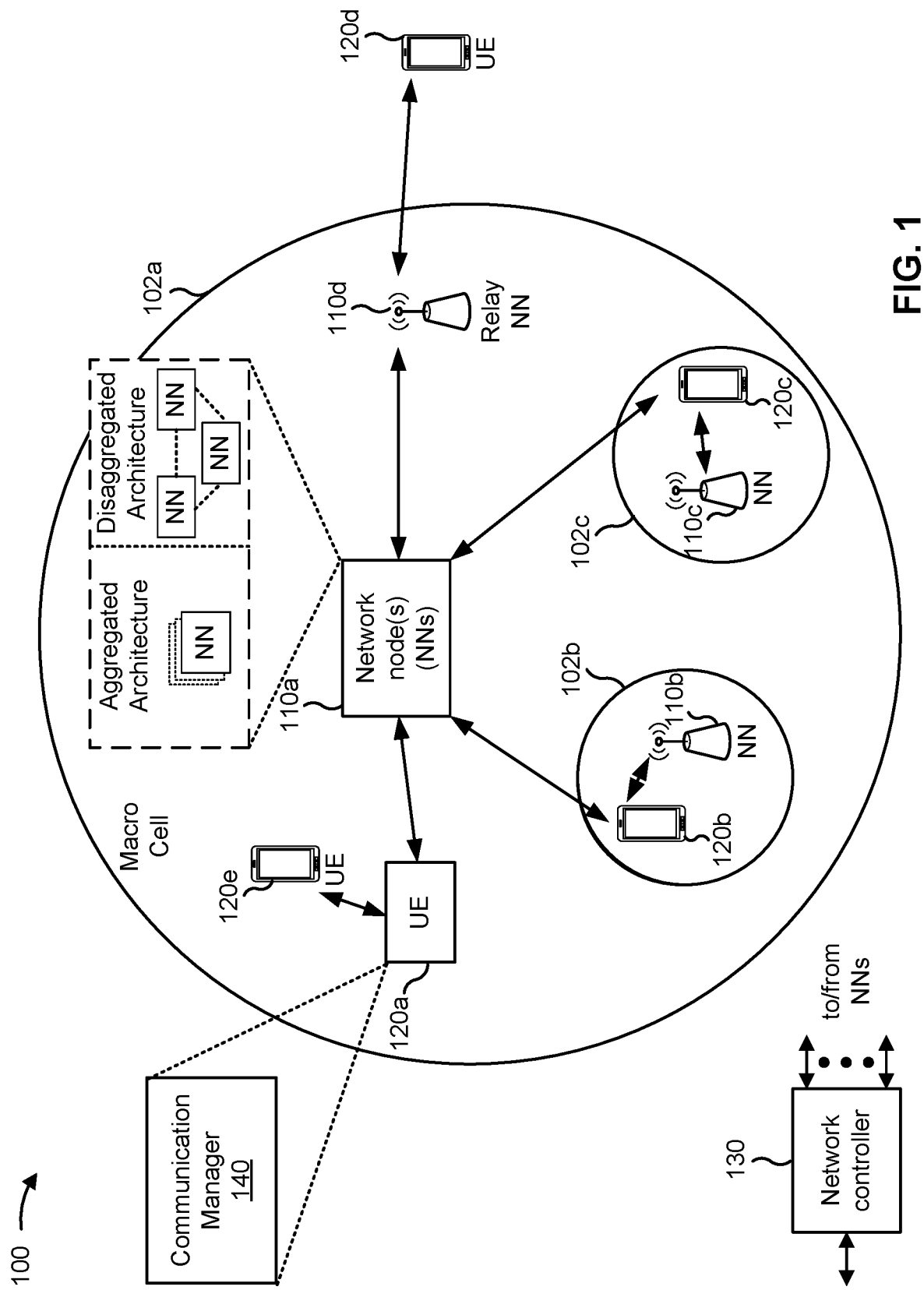
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a packet from a source node; identify a select mini-slot or a select sub-band for transmitting the packet based at least in part on a reference signal measurement that is indicated per mini-slot of a plurality of mini-slots or per sub-band of a plurality of sub-bands; and transmit the packet to a destination node using the select mini-slot or the select sub-band. Additionally, or alternatively, the communication manager 140 may perform one or more other operations described herein.

As indicated above, FIG. 1 is provided as an example. Other examples may differ from what is described with regard to FIG. 1.

Figure 2:
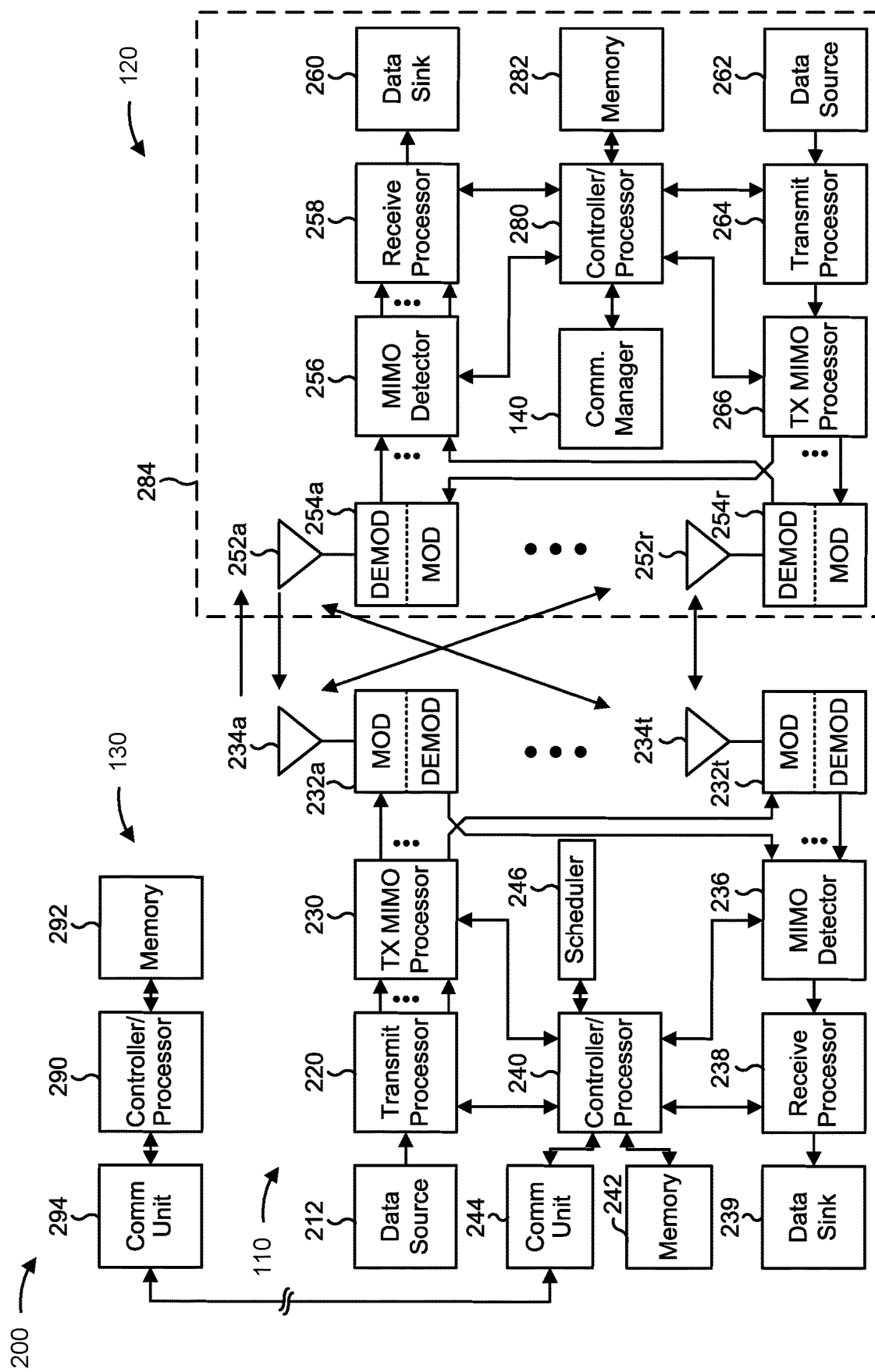
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the network node 110, the controller/processor 280 of the UE 120, and/or any other component(s) of FIG. 2 may perform one or more techniques associated with UE relaying using mini-slots, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, and/or other processes as described herein. In some examples, executing instructions may include running the instructions, converting the instructions, compiling the instructions, and/or interpreting the instructions, among other examples.

In some aspects, the relay UE (e.g., the UE 120) includes means for receiving a packet from a source node; means for identifying a select mini-slot or a select sub-band for transmitting the packet based at least in part on a reference signal measurement that is indicated per mini-slot of a plurality of mini-slots or per sub-band of a plurality of sub-bands; and/or means for transmitting the packet to a destination node using the select mini-slot or the select sub-band. The means for the relay UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
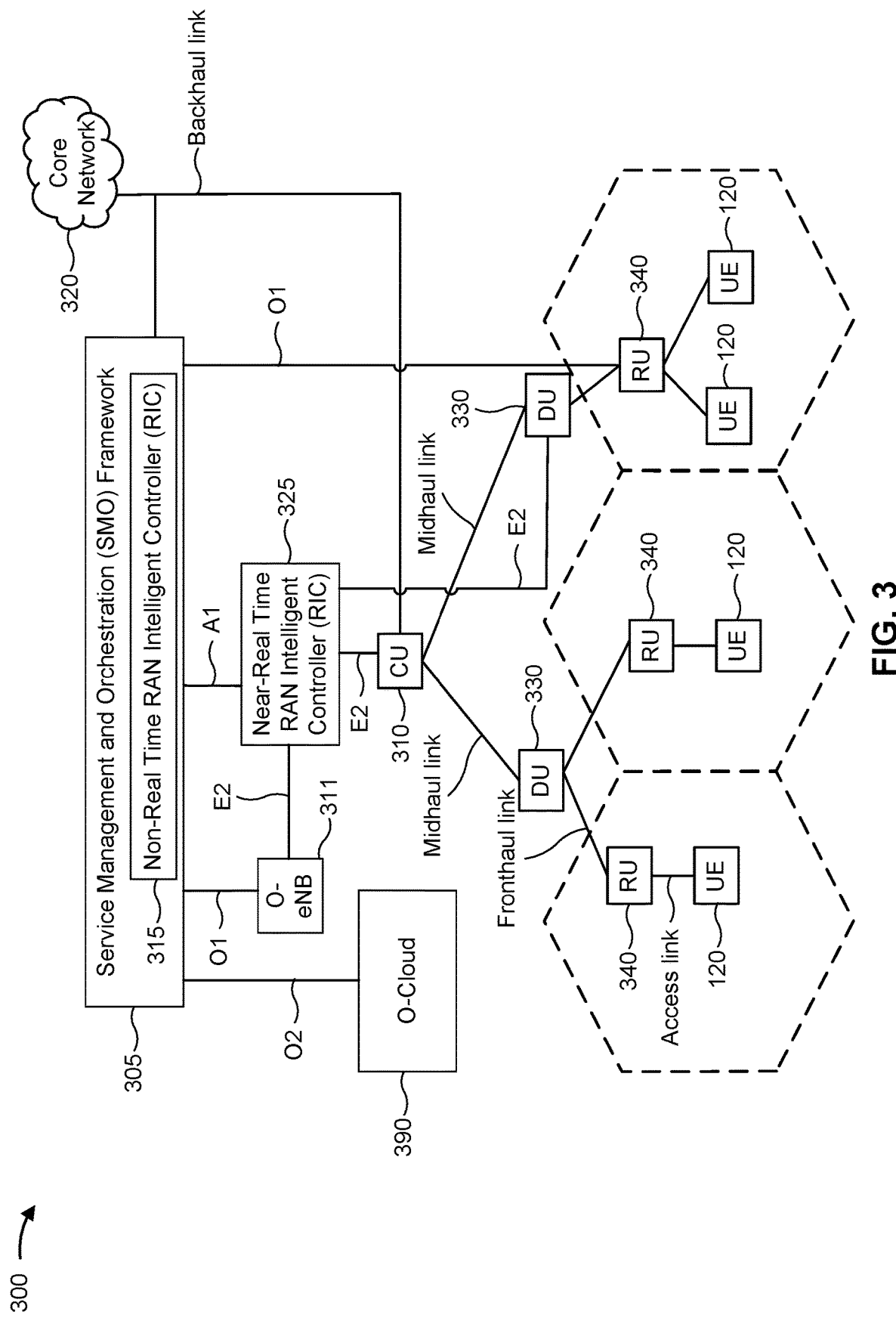
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
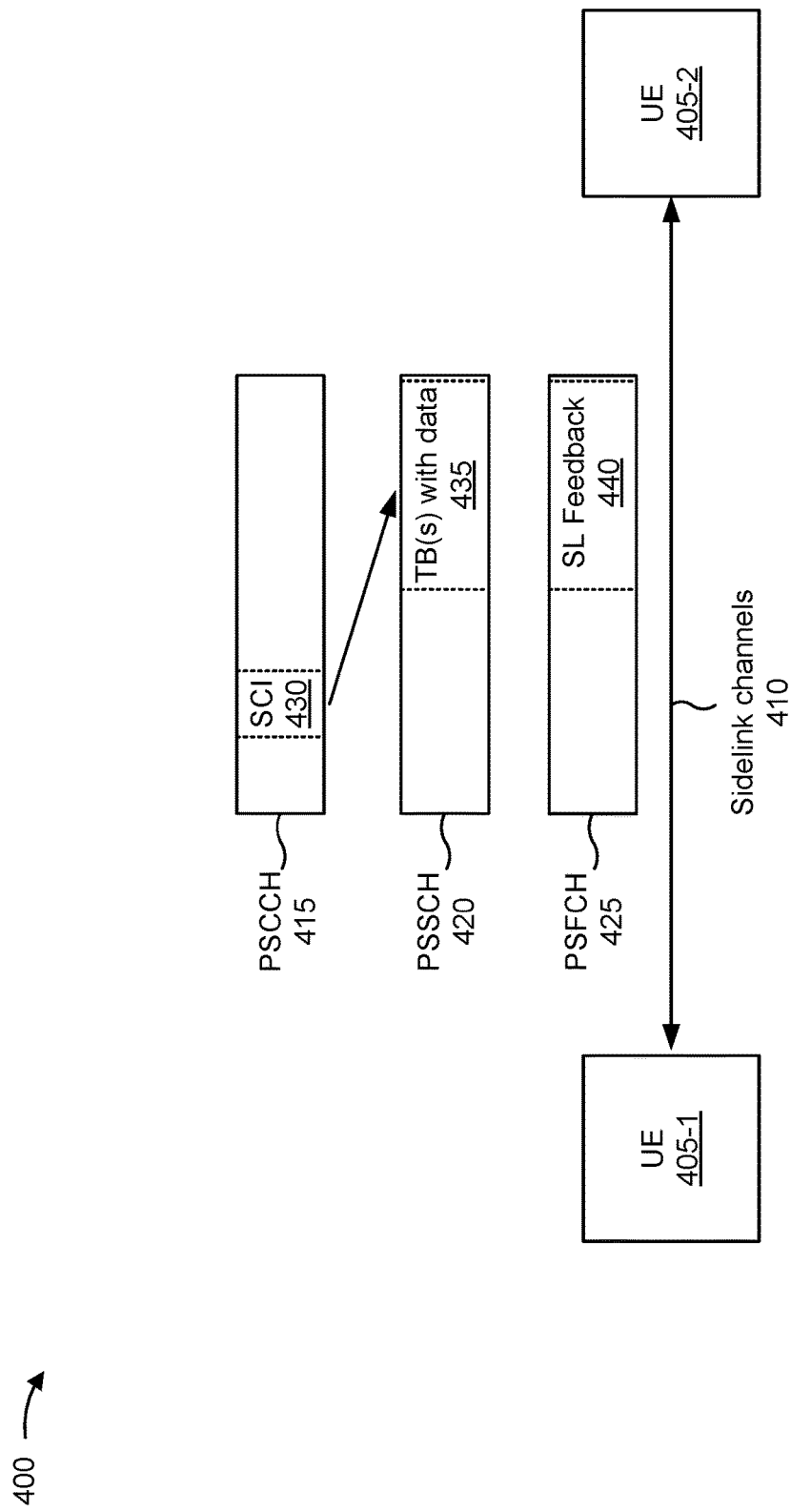
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) and/or a physical uplink control channel (PUCCH) used for cellular communications with a network node 110 via an access link or an access channel. The PSSCH 420 may be used to communicate data, similar to a physical downlink shared channel (PDSCH) and/or a physical uplink shared channel (PUSCH) used for cellular communications with a network node 110 via an access link or an access channel. For example, the PSCCH 415 may carry sidelink control information (SCI) 430, which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as an HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a network node 110 (e.g., a base station, a CU, or a DU). For example, the UE 405 may receive a grant (e.g., in downlink control information (DCI) or in an RRC message, such as for configured grants) from the network node 110 (e.g., directly or via one or more network nodes) for sidelink channel access and/or scheduling. In some aspects, a UE 405 may operate using a transmission mode (e.g., Mode 2) where resource selection and/or scheduling is performed by the UE 405 (e.g., rather than a network node 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
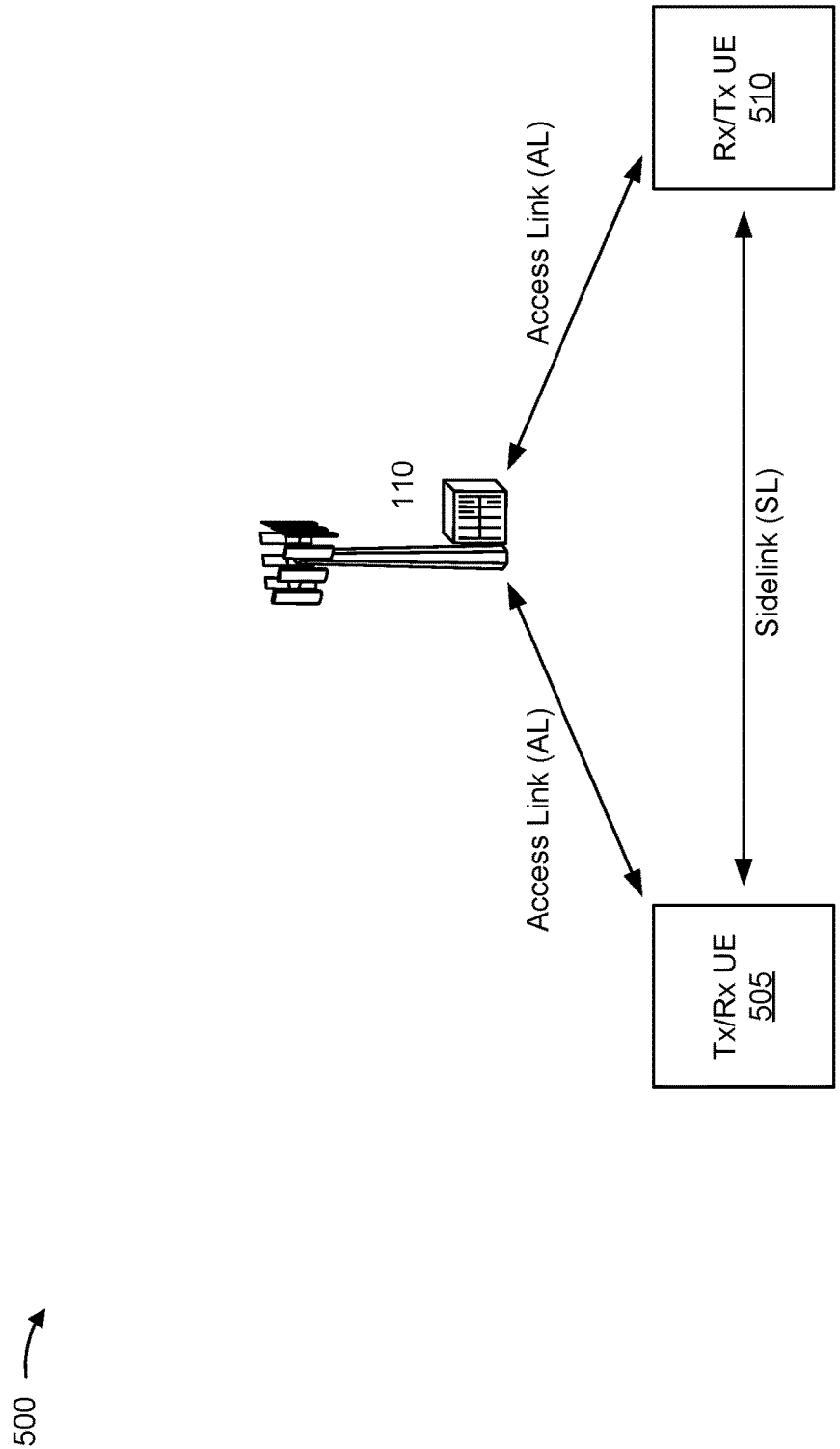
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a network node 110 may communicate with the Tx/Rx UE 505 (e.g., directly or via one or more network nodes), such as via a first access link. Additionally, or alternatively, in some sidelink modes, the network node 110 may communicate with the Rx/Tx UE 510 (e.g., directly or via one or more network nodes), such as via a first access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a network node 110 and a UE 120 (e.g., via a Uu interface) may be referred to as an access link. Sidelink communications may be transmitted via the sidelink, and access link communications may be transmitted via the access link. An access link communication may be either a downlink communication (from a network node 110 to a UE 120) or an uplink communication (from a UE 120 to a network node 110).

As indicated above, FIG. 5 is provided as an example. Other examples may differ from what is described with respect to FIG. 5.

Figure 6:
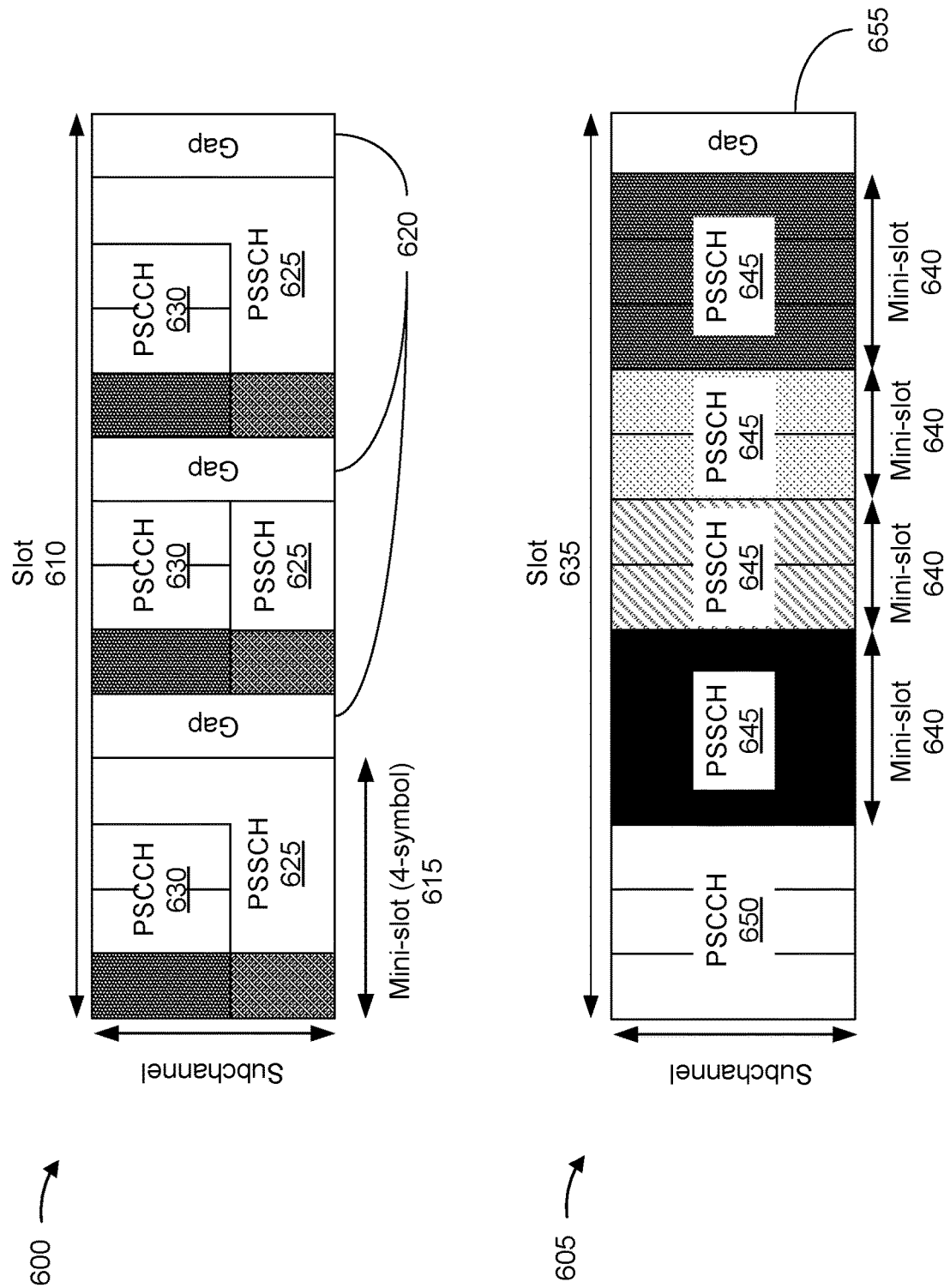
FIG. 6 is a diagram illustrating examples of coverage scenarios and mini-slot structures, in accordance with the present disclosure.

FIG. 6 is a diagram illustrating examples 600 and 605 of coverage scenarios and mini-slot structures, in accordance with the present disclosure. In some cases, the network node 110 may communicate with a UE 120-1 and/or a UE 120-2. Various coverage scenarios associated with the network node 110, the UE 120-1, and the UE 120-2 are described below.

In a first example, the network node 110, the UE 120-1 and the UE 120-2 may be in-coverage. In this case, both the UE 120-1 and the UE 120-2 may communicate with the network node 110 via a radio link interface (such as a Uu interface). Similarly, the UE 120-1 and the UE 120-2 may communicate via a sidelink interface (such as a PC5 interface). Sidelink authorization and provisioning via the radio link interface may be necessary to support sidelink operations. For example, the network node 110 may manage discovery and/or resource allocation for sidelink communications between the UE 120-1 and the UE 120-2.

In a second example, the UE 120-1 and the UE 120-2 may be out-of-coverage. In this case, neither the UE 120-1 nor the UE 120-1 can communicate with the network node 110 via the radio link interface. However, the UE 120-1 and the UE 120-2 may communicate via the sidelink interface. The UE 120-1 and the UE 120-2 may operate without authorization and provisioning from the network node 110. The UE 120-1 and the UE 120-2 may be configured with sidelink provisioning information for discovery and communication support.

In a third example, the UE 120-1 may communicate with the network node 110 via the radio link interface. However, the UE 120-2 may not communicate with the network node 110 via the radio link interface. The UE 120-1 and the UE 120-2 may communicate via the sidelink interface. In this case, the UE 120-1 may relay communications between the UE 120-2 and the network node 110. For example, the UE 120-2 may relay communications from the network node 110 to the UE 120-2 and/or may relay communications from the UE 120-2 to the network node 110. Both authorization and provisioning via the radio link interface and configured sidelink provisioning may be used.

In a fourth example, the UE 120-1 may relay communications between the UE 120-2 and the network node 110, where the UE 120-2 is within a coverage area of the network node 110. Both the UE 120-1 and the UE 120-2 may communicate with the network node 110 via the radio link interface, and the UE 120-1 and the UE 120-2 may separately communicate via the sidelink interface. In this case, the UE 120-2 may communicate with the network node 110 directly via the radio link interface, or may communicate with the network node 110 indirectly through a relaying operation performed by the UE 120-1.

In a fifth example, the UE 120-1 may relay communications between the UE 120-2 and the network node 110, where the UE 120-2 is not within a coverage area of the network node 110. The UE 120-1 may communicate with the network node 110 via the radio link interface. However, the UE 120-2 may not communicate with the network node 110 via the radio link interface. The UE 120-1 and the UE 120-2 may communicate via the sidelink interface. In this case, the UE 120-2 may only communicate with the network node 110 indirectly through a relaying operation performed by the UE 120-1.

In a sixth example, the network node 110 may communicate with the UE 120-1, the UE 120-2, and a UE 120-3. The UE 120-1, the UE 120-2, and the UE 120-3 may all be within a coverage area of the network node 110. Thus, the network node 110 may separately communicate with each of the UE 120-1, the UE 120-2, and the UE 120-3. Additionally, the UE 120-1 may communicate with the UE 120-2 and the UE 120-3 via the sidelink interface. However, the UE 120-2 and the UE 120-3 may not communicate directly via the sidelink interface. In this case, the UE 120-1 may relay sidelink communications between the UE 120-2 and the UE 120-3. Additionally, the UE 120-1 may relay communications by the UE 120-2 and/or the UE 120-3 to the network node 110. The UE 120-1 (e.g., the relay UE) may be controlled by the network node 110 for UE-to-UE relay routing and operation.

In a seventh example, the UE 120-1, the UE 120-2, and the UE 120-3 may not be within a coverage area of the network node 110. Thus, the network node 110 may not separately communicate with the UE 120-1, the UE 120-2, or the UE 120-3. The UE 120-1 may communicate with the UE 120-2 and the UE 120-3 via the sidelink interface. In some cases, the UE 120-2 and the UE 120-3 may not be able to communicate directly via the sidelink interface. Thus, the UE 120-1 may relay sidelink communications between the UE 120-2 and the UE 120-3. In some other cases, the UE 120-2 and the UE 120-3 may communicate directly via the sidelink interface. The UE 120-1 (e.g., the relay UE) may be configured to manage relay routing and operations.

In some cases, scheduling and turnaround times for sidelink communications may be reduced using mini-slot (e.g., sub-slot) scheduling. As shown in the example 600, a slot 610 may comprise a plurality of mini-slots 615. Each of the mini-slots 615 may comprise a number of symbols, such as three symbols or four symbols. The mini-slots 615 within the slot 610 may be separated by a gap symbol 620. In some cases, each of the mini-slots 615 may include a PSSCH 625 and a PSCCH 630. The PSCCH 630 may be scheduled and decoded for the corresponding mini-slot. In some cases, as the number of mini-slots increases per-slot (which may reduce scheduling latency and may be suitable for small packet communication), more symbols may be allocated to the gap symbols 620. In some cases, for example, if a large number of UEs need to be supported, the overhead caused by this design may degrade the latency reduction gains.

In some cases, gap symbols may only be needed for transmission or reception switching (Tx/Rx switching). As shown in the example 605, a slot 635 may be split into multiple mini-slots 640 according to a given pattern (e.g., based at least in part on a length of each mini-slot or a number of mini-slots per slot). Each of the mini-slots may include a PSSCH 645. In some cases, a PSCCH 650 (or first stage SCI (SCI-1)) may be located at the beginning of the slot 635. The PSCCH 650 (or SCI-1) may indicate a transmission or reservation of a number of mini-slots in the slot 635, or in future slots. The slot 635 may include a gap symbol 655 at the end of the slot 635 (e.g., after the last mini-slot 640). In some cases, automatic gain control (AGC) symbols may not be needed since the receiver can set the AGC based at least in part on the first symbol of the slot and may use the same setting for the reception of any of the PSSCH mini-slots.

The relay UE may be configured to relay communications between two other devices. In some cases, the relay UE may be a smart repeater. The smart repeater may only be configured with a portion of the digital processing capabilities of a traditional UE (such as the UE 120). The smart repeater may be configured to perform FFT in the case of amplify-and-forward (AF) relaying or to perform full decoding in the case of decode-and-forward (DF) relaying. In some cases, the relay UE may be configured to relay communications using mini-slots or sub-bands. However, the relay UE may not be configured with information that enables the relay UE to determine which mini-slot or which sub-band is to be used for relaying the communications.

Techniques and apparatuses are described herein for UE relaying using mini-slots. In some aspects, a relay UE may receive a packet from a source node, such as a source UE or a source network node. The relay UE may identify a select mini-slot or a select sub-band for transmitting the packet based at least in part on a reference signal measurement that is indicated per mini-slot of a plurality of mini-slots or per sub-band of a plurality of sub-bands. The reference signal may be a DMRS, and the reference signal measurement may be (or may include) an RSRP measurement, an RSRQ measurement, a CSI measurement, or channel quality information associated with a previous mini-slot transmission or a previous sub-band transmission. The relay UE may transmit the packet to a destination node, such as a destination UE or a destination network node, using the select mini-slot or the select sub-band.

As described above, the relay UE may be configured to relay communications between two other devices. In some cases, the relay UE may be configured to relay communications using mini-slots or sub-bands. However, the relay UE may not be configured with information that enables the relay UE to determine which mini-slot or which sub-band is to be used for relaying communications. Using the techniques and apparatuses described herein, the relay UE may identify select mini-slots or select sub-bands for relaying packets based at least in part on reference signal measurements. The relay UE may transmit the packet to a destination node using the select mini-slot or the select sub-band, such as the mini-slot or the sub-band that is associated with a highest reference signal measurement.

As indicated above, FIG. 6 is provided as an example. Other examples may differ from what is described with respect to FIG. 6.

Figure 7:
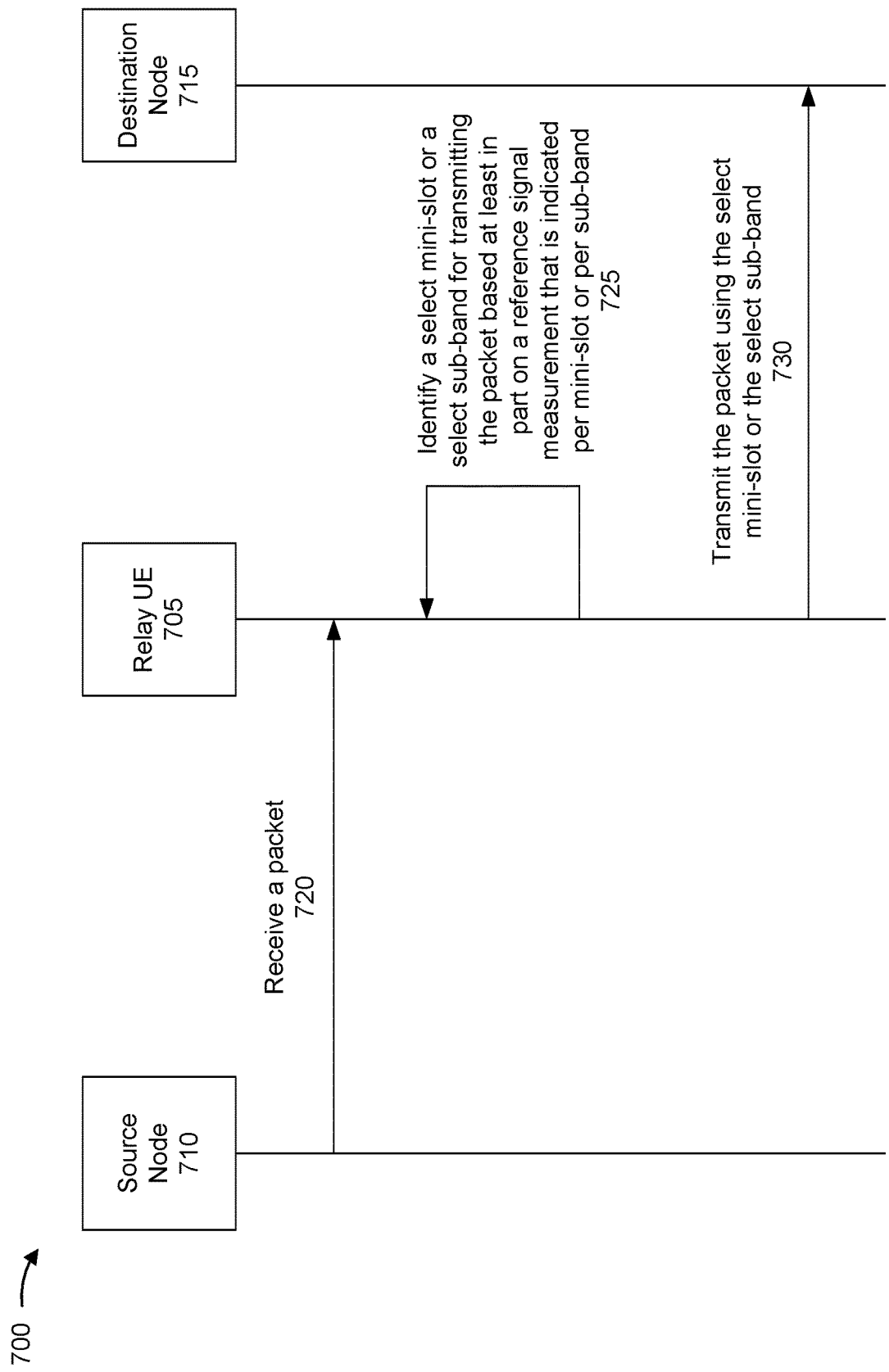
FIG. 7 is a diagram illustrating an example of UE relaying using mini-slots, in accordance with the present disclosure.

FIG. 7 is a diagram illustrating an example 700 of UE relaying using mini-slots, in accordance with the present disclosure. A relay UE 705 may communicate with a source node 710 and a destination node 715. The relay UE 705 may include some or all of the features of the UE 120. In some aspects, the relay UE 705 may be a repeater, such as the smart repeater described herein. The source node 710 may include some or all of the features of the UE 120 and/or the network node 110. Similarly, the destination node 715 may include some or all of the features of the UE 120 and/or the network node 110.

As shown by reference number 720, the relay UE 705 may receive a packet from the source node 710. The packet may be received from the source node 710 via a mini-slot or a sub-band. As described herein, the mini-slot or the sub-band that is used for receiving the packet from the source node 710 may be different than the mini-slot or the sub-band that is used for transmitting the packet to the destination node 715.

As shown by reference number 725, the relay UE 705 may identify a select mini-slot or a select sub-band for transmitting the packet based at least in part on a reference signal measurement. In some aspects, the reference signal may be a DMRS, and the reference signal measurement may be a DMRS measurement. In some aspects, the reference signal measurement may be (or may include) an RSRP measurement, an RSRQ measurement, a CSI measurement, or may be based at least in part on previous measurements associated with the mini-slot or sub-band. In some aspects, the reference signal measurement may be indicated per mini-slot of a plurality of mini-slots or per sub-band of a plurality of sub-bands. In one example, the relay UE 705 may amplify-and-forward on a first mini-slot and a second mini-slot, or may decode-and-forward on the first mini-slot and the second mini-slot, based at least in part on CSI that is transmitted from the source node 710 to the relay UE 705 and/or CSI that is transmitted from the relay UE 705 to the destination node 715.

In some aspects, the relay UE 705 may identify another select mini-slot or another select sub-band for receiving the packet based at least in part on the reference signal measurement or another reference signal measurement that is indicated per mini-slot of a plurality of mini-slots or per sub-band of a plurality of sub-bands. In some aspects, the select mini-slot is the same as the other select mini-slot and/or the select sub-band is the same as the other sub-band.

In some aspects, the select mini-slot is different than the other select mini-slot and/or the select sub-band is different than the other select sub-band. In some aspects, the select mini-slot and the other select mini-slot occupy the same slot and/or the select sub-band and the other select sub-band occupy the same sub-band. In some aspects, the select mini-slot and the other select mini-slot occupy different slots and/or the select sub-band and the other select sub-band occupy different sub-bands. In some aspects, the time gap between a first slot and a second slot may be 0, 1, or any integer.

In some aspects, the relay UE 705 may receive an indication of which mini-slot or which sub-band that the relay UE 705 is to use for forwarding the packet. For example, a network node may transmit DCI that indicates which mini-slot or which sub-band is to be used based at least in part on the reference signal measurement associated with the source node-to-relay UE link and/or the relay UE-to-destination node link. In another example, the source node 710 or another UE may transmit Layer 1 signaling, Layer 2 signaling, or Layer 3 signaling that indicates which mini-slot or which sub-band is to be used based at least in part on the reference signal measurement associated with the source node-to-relay UE link and/or the relay UE-to-destination node link. In some aspects, each mini-slot or each sub-band may be associated (e.g., may be used) by different UEs or by different nodes. In this case, the relay UE 705 may receive an indication to transmit the packet via a particular mini-slot or a particular sub-band. The indication may be received from the source node 710, a network node, or another UE.

In some aspects, the relay UE 705 may obtain (e.g., receive or generate) a bitmap that indicates which mini-slot or which sub-band is to be used by the relay UE 705 for transmitting the packet. For example, each bit of the bitmap may correspond to a particular mini-slot or a particular sub-band. A first state of the bit may indicate that the relay UE 705 should transmit the packet using the corresponding mini-slot or sub-band, and a second state of the bit may indicate that the relay UE 705 should not transmit the packet using the corresponding mini-slot or sub-band. In some aspects, the bitmap may indicate a type of relaying that is to be used. For example, the bitmap may indicate for the relay UE 705 to use AF relaying or DF relaying.

In some aspects, one or more time resources and one or more frequency resources may be indicated for the relay UE 705 to transmit the packet. For example, a bundle of time resources (e.g., one or more OFDM symbols) and frequency resources (e.g., resource elements, resource blocks, sub-channels, or set of resources, among other examples) may be indicated for the relay UE 705 to use for transmitting the packet. In some aspects, a first comb (comb A) may be defined in a time domain and a second comb (comb B) may be defined in a frequency domain Additionally, a time gap and a frequency gap may be defined. The relay UE 705 may be configured to transmit data using the first comb, and another UE (e.g., another relay UE) may be configured to transmit data using the second comb. This may improve communication diversity and may reduce errors across consecutive resource elements. In some aspects, each UE may forward a fraction of the data (e.g., a portion of the packet) during each transmission associated with the comb. Additional details regarding these features are described in connection with FIG. 8.

In some aspects, the relay UE 705 may be configured to relay a portion of data associated with the packet. For example, the relay UE 705 may receive a sub-band indication for transmission or reception. In some aspects, the sub-band indication may be based at least in part on a quality (e.g., a reference signal measurement) associated with a portion of a time-frequency grid. In one example, a sub-band may have high reception quality but poor transmission quality, while another sub-band may have poor reception quality but high transmission quality. In this case, the relay UE 705 (using AF relaying) may receive an indication to transmit a signal on a first data grid (data grid A) associated with a first sub-band (sub-band A) and to receive a signal on a second data grid (data grid B) associated with a second sub-band (sub-band B). For example, the relay UE 705 may receive the indication based at least in part on a reception channel quality and/or a transmission channel quality. In some aspects, the relay UE 705 may be configured to receive the packet using data grid A and may be configured to transmit the packet using a third data grid (data grid C). For example, the relay UE 705 may receive an indication, such as from the source node 710, to receive the packet using data grid A and to transmit the packet using data grid C. Additional details regarding these features are described in connection with FIG. 9.

In some aspects, the relay UE 705 may be configured to perform repetition or encoding for a portion of the data. In some aspects, such as when DF relaying is used, the relay UE 705 may receive the data on sub-band A and may perform repetition or encoding of the data on sub-band C. In some aspects, such as when AF relaying is used, the relay UE 705 may repeat a resource element (or multiple resource elements) until a sub-band allocation is complete. In one example, if the transmission sub-band (the sub-band for relaying the packet) is smaller in size than the reception sub-band (the sub-band for receiving the packet), the relay UE 705 may perform a puncturing operation. For example, if the reception sub-band is 2×3 (2 resource blocks and 3 OFDM symbols) and the transmission sub-band is 1×3 (1 resource block and 3 OFDM symbols), the relay UE 705 may forward or copy the data on the transmission sub-band. In another example, if the transmission sub-band is larger than the reception sub-band, the relay UE 705 may vectorize the quadrature amplitude modulation (QAM) into a vector of symbols and may include the data on the reception sub-band. For example, the relay UE 705 may include the data on the reception sub-band while repeating as necessary (e.g., similar to a circular buffer).

In some aspects, the relay UE 705 may be configured to allocate the transmission in the time domain, where T is a total number of symbols that are assigned for the relays in a slot. The relay UE 705 may perform a first relay in a first subset of the symbols and may perform a second relay in a second subset of the symbols. In some aspects, the relay UE may be configured to allocate the transmission in the frequency domain, where K is the number of resource blocks that are assigned for relays. The relay UE 705 may perform a first relay in a first number of symbols associated with a frequency domain and to perform a second relay in a second number of symbols associated with the frequency domain. In some aspects, the time domain and/or the frequency domain may have DMRS symbols or tones. For example, if AF relaying is being performed, the source node 710 may need to have DMRS configured accordingly for all (e.g., both) relays. Alternatively, if DR relaying is being performed, then each relay allocation may have its own DMRS structure. Additional details regarding these features are described in connection with FIG. 10.

In some aspects, the relay UE 705 may receive SCI that includes at least one of a source node identifier, a final destination node identifier, a next destination node identifier, or a group identifier. In one example, the relay UE 705 may receive SCI-1 that includes the source node identifier, the final destination node identifier, and at least one of the next destination node identifier or the group identifier. In another example, the relay UE 705 may receive SCI-1 that includes the source node identifier and the final destination node identifier. In another example, the relay UE 705 may receive SCI-1 that includes the source node identifier and at least one of the next destination node identifier or the group identifier, and may receive SCI-2 that includes the final destination node identifier. In another example, the relay UE 705 may receive SCI-1 that includes the source node identifier and the final destination node identifier, and may receive SCI-2 that includes at least one of the next destination node identifier or the group identifier.

As shown by reference number 730, the relay UE 705 may transmit the packet to the destination node 715 using the select mini-slot or the select sub-band. For example, the relay UE 705 may relay the packet (or a portion of the packet) from the source node 710 to the destination node 715 using AF relaying or DF relaying, among other examples.

As described above, the relay UE 705 may be configured to relay communications between the source node 710 and the destination node 715. In some aspects, the relay UE 705 may be configured to relay communications using mini-slots or sub-bands. However, the relay UE 705 may not be configured with information that enables the relay UE 705 to determine which mini-slot or which sub-band is to be used for relaying communications. Using the techniques and apparatuses described herein, the relay UE 705 may identify select mini-slots or select sub-bands for relaying packets based at least in part on reference signal measurements. The relay UE 705 may transmit the packet to the destination node 715 using the select mini-slot or the select sub-band, such as the mini-slot or the sub-band that is associated with a highest reference signal measurement.

As indicated above, FIG. 7 is provided as an example. Other examples may differ from what is described with respect to FIG. 7.

Figure 8:
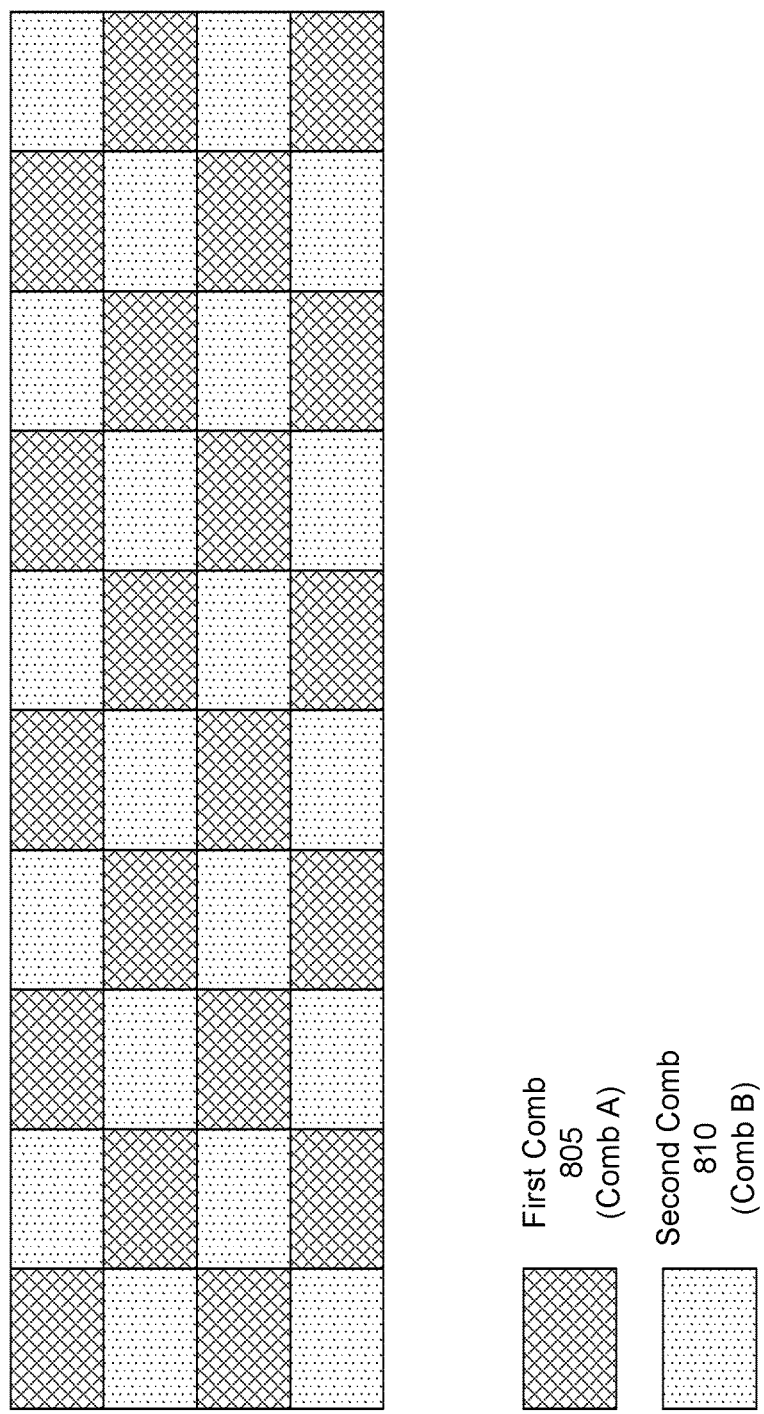
FIG. 8 is a diagram illustrating an example of a comb structure, in accordance with the present disclosure.

FIG. 8 is a diagram illustrating an example 800 of a comb structure, in accordance with the present disclosure. As described herein, one or more time resources and one or more frequency resources may be indicated for the relay UE 705 to transmit the packet. For example, a bundle of time resources (e.g., one or more OFDM symbols) and frequency resources (e.g., resource elements, resource blocks, sub-channels, or set of resources, among other examples) may be indicated for the relay UE 705 to use for transmitting the packet. In some aspects, a first comb 805 (comb A) may be defined in a time domain and a second comb 810 (comb B) may be defined in a frequency domain. The relay UE 705 may be configured to transmit data using the first comb 805, and another UE (e.g., another relay UE) may be configured to transmit data using the second comb 810. This may improve communication diversity and may reduce errors across consecutive resource elements.

As indicated above, FIG. 8 is provided as an example. Other examples may differ from what is described with respect to FIG. 8.

Figure 9:
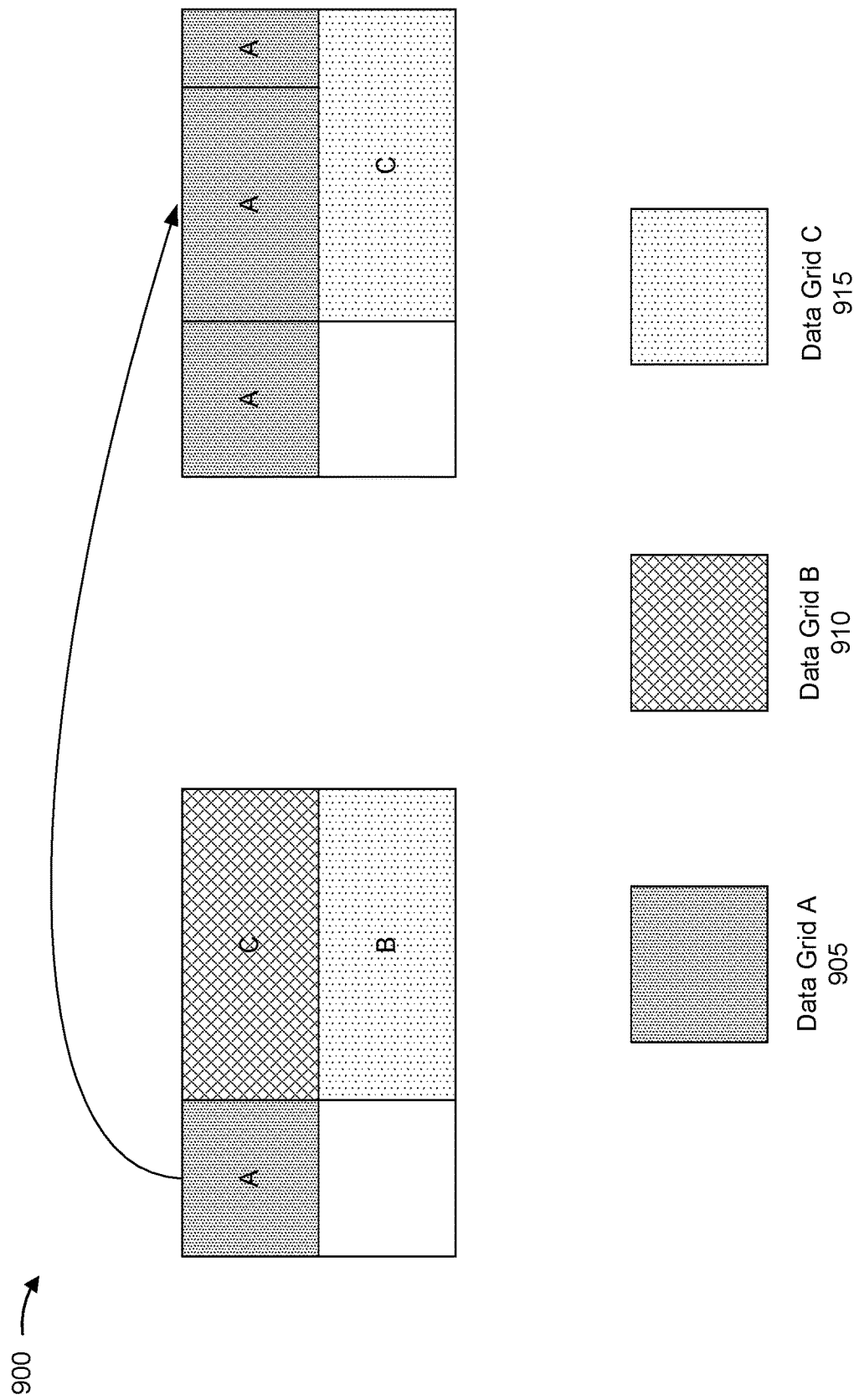
FIG. 9 is a diagram illustrating an example of a data grid, in accordance with the present disclosure.

FIG. 9 is a diagram illustrating an example 900 of a data grid, in accordance with the present disclosure. As described herein, the relay UE 705 may be configured to relay a portion of data associated with the packet. For example, the relay UE 705 may receive a sub-band indication for transmission or reception. In some aspects, the sub-band indication may be based at least in part on a quality (e.g., a reference signal measurement) associated with a portion of a time-frequency grid. In one example, a sub-band may have high reception quality but poor transmission quality, while another sub-band may have poor reception quality but high transmission quality. In this case, the relay UE 705 (using AF relaying) may receive an indication to transmit a signal on a first data grid (data grid A 905) associated with a first sub-band (sub-band A) and to receive a signal on a second data grid (data grid B 910) associated with a second sub-band (sub-band B). For example, the relay UE 705 may receive the indication based at least in part on a reception channel quality and/or a transmission channel quality. In some aspects, the relay UE 705 may be configured to receive the packet using data grid A 905 and to transmit the packet using a third data grid (data grid C 915). For example, the relay UE 705 may receive an indication, such as from the source node 710, to receive the packet using data grid A 905 and to transmit the packet using data grid C 915. In some aspects, the relay UE 705 may be configured to perform repetition or encoding for a portion of the data associated with the packet. In some aspects, such as when DF relaying is used, the relay UE 705 may receive the data on data grid A 905 and may perform repetition or encoding of the data on data grid C 915.

As indicated above, FIG. 9 is provided as an example. Other examples may differ from what is described with respect to FIG. 9.

Figure 10:
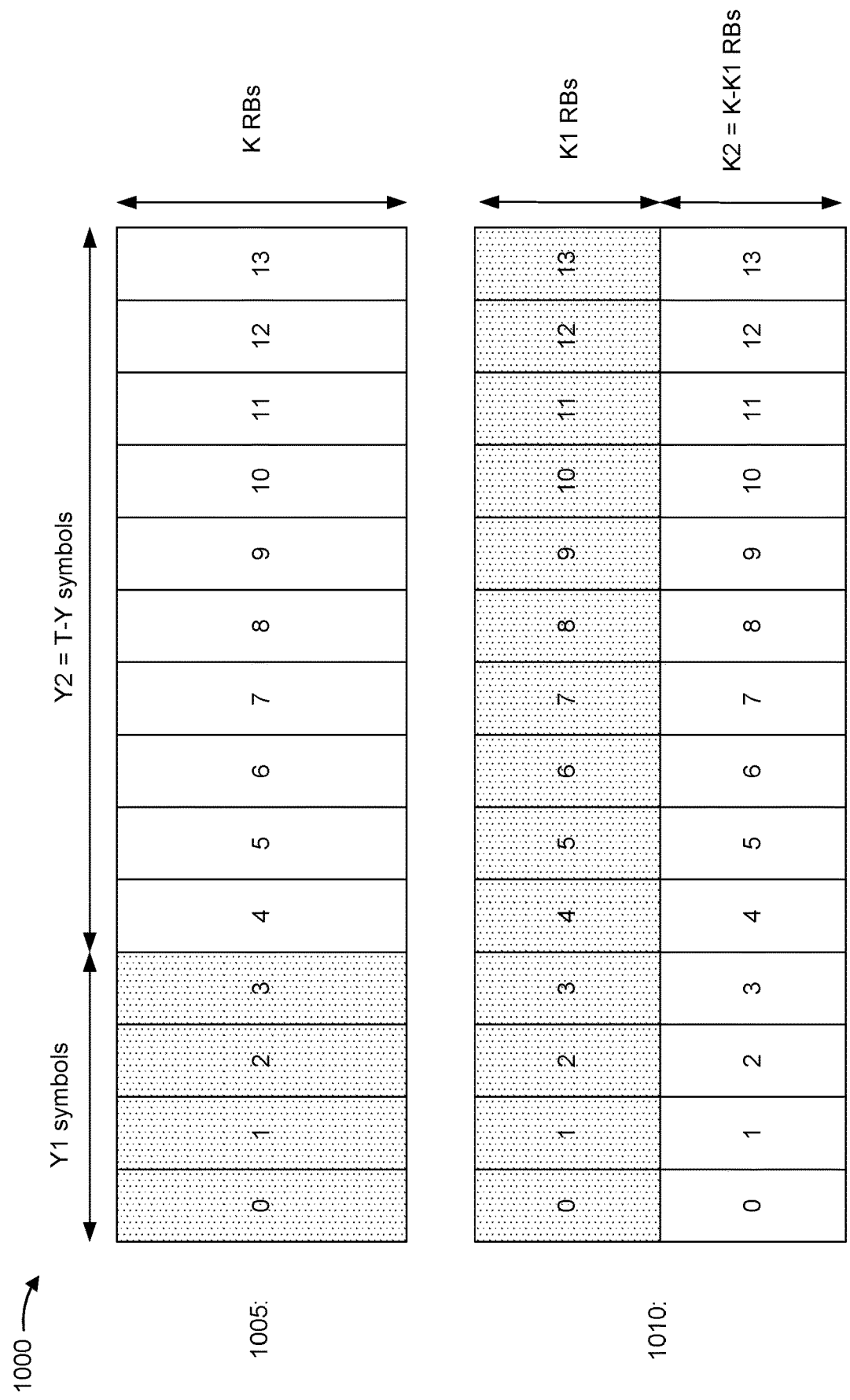
FIG. 10 is a diagram illustrating an example of time domain and frequency domain allocation, in accordance with the present disclosure.

FIG. 10 is a diagram illustrating an example 1000 of time domain and frequency domain allocation, in accordance with the present disclosure. As described herein, the relay UE 705 may be configured to allocate the transmission in the time domain (such as the time domain 1005), where T is a total number of symbols that are assigned for the relays in a slot. The relay UE 705 may perform a first relay in a first subset of the symbols and may perform a second relay in a second subset of the symbols. In some aspects, the relay UE may be configured to allocate the transmission in the frequency domain (such as the frequency domain 1010), where K is the number of resource blocks that are assigned for relays. The relay UE 705 may perform a first relay in a first number of symbols associated with the frequency domain 1010 and to perform a second relay in a second number of symbols associated with the frequency domain 1010. In some aspects, the time domain 1005 and/or the frequency domain 1010 may have DMRS symbols or tones. For example, if AF relaying is being performed, the source node 710 may need to have DMRS configured accordingly for both relays. Alternatively, if DR relaying is being performed, then each relay allocation may have its own DMRS structure.

As indicated above, FIG. 10 is provided as an example. Other examples may differ from what is described with respect to FIG. 10.

Figure 11:
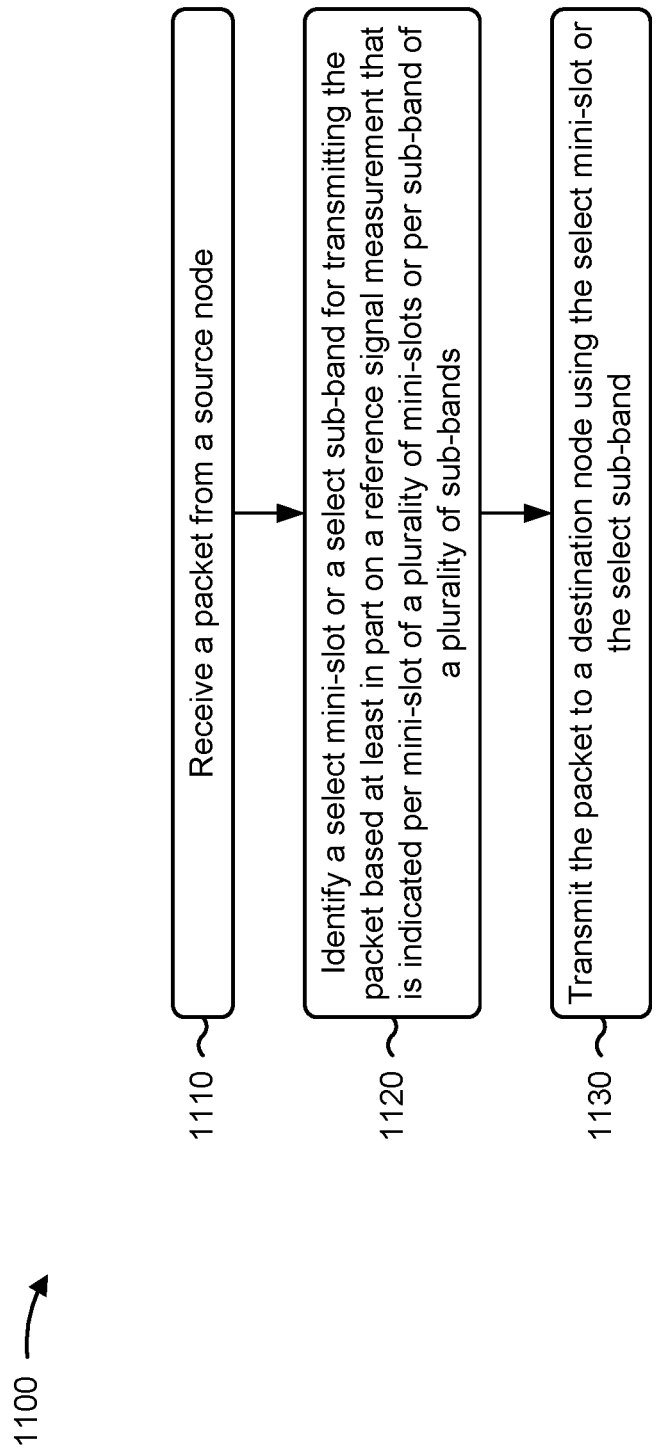
FIG. 11 is a diagram illustrating an example process performed, for example, by a relay UE, in accordance with the present disclosure.

FIG. 11 is a diagram illustrating an example process 1100 performed, for example, by a relay UE, in accordance with the present disclosure. Example process 1100 is an example where the UE (e.g., UE 120) performs operations associated with UE relaying using mini-slots.

As shown in FIG. 11, in some aspects, process 1100 may include receiving a packet from a source node (block 1110). For example, the UE (e.g., using communication manager 140 and/or reception component 1202, depicted in FIG. 12) may receive a packet from a source node, as described above.

As further shown in FIG. 11, in some aspects, process 1100 may include identifying a select mini-slot or a select sub-band for transmitting the packet based at least in part on a reference signal measurement that is indicated per mini-slot of a plurality of mini-slots or per sub-band of a plurality of sub-bands (block 1120). For example, the UE (e.g., using communication manager 140 and/or identification component 1208, depicted in FIG. 12) may identify a select mini-slot or a select sub-band for transmitting the packet based at least in part on a reference signal measurement that is indicated per mini-slot of a plurality of mini-slots or per sub-band of a plurality of sub-bands, as described above.

As further shown in FIG. 11, in some aspects, process 1100 may include transmitting the packet to a destination node using the select mini-slot or the select sub-band (block 1130). For example, the UE (e.g., using communication manager 140 and/or transmission component 1204, depicted in FIG. 12) may transmit the packet to a destination node using the select mini-slot or the select sub-band, as described above.

Process 1100 may include additional aspects, such as any single aspect or any combination of aspects described below and/or in connection with one or more other processes described elsewhere herein.

In a first aspect, a reference signal associated with the reference signal measurement is a channel state reference signal that is communicated by the relay UE before associated data or a demodulation reference signal, or is associated with a channel state reference signal that is multiplexed with the associated data or the demodulation reference signal.

In a second aspect, alone or in combination with the first aspect, the channel state reference signal that is communicated by the relay UE is received by the relay UE via a sidelink interface or a radio link interface or is transmitted by the relay UE via the sidelink interface or the radio link interface.

In a third aspect, alone or in combination with one or more of the first and second aspects, receiving the packet from the source node comprises receiving the packet via a different mini-slot than the select mini-slot used for transmitting the packet or receiving the packet via a different sub-band than the select sub-band used for transmitting the packet.

In a fourth aspect, alone or in combination with one or more of the first through third aspects, the reference signal measurement includes a reference signal received power measurement, a reference signal received quality measurement, channel state information, or channel quality information associated with a previous mini-slot transmission or a previous sub-band transmission.

In a fifth aspect, alone or in combination with one or more of the first through fourth aspects, the reference signal measurement is based at least in part on a reference signal that is communicated between the source node and the relay UE or a reference signal that is communicated between the relay UE and the destination node.

In a sixth aspect, alone or in combination with one or more of the first through fifth aspects, transmitting the packet to the destination node comprises performing an amplify-and-forward operation or a decode-and-forward operation.

In a seventh aspect, alone or in combination with one or more of the first through sixth aspects, process 1100 includes receiving information from the destination node that indicates which mini-slot of the plurality of mini-slots or which sub-band of the plurality of sub-bands is to be used for transmitting the packet.

In an eighth aspect, alone or in combination with one or more of the first through seventh aspects, receiving the information from the destination node comprises receiving downlink control information, a medium access control message, or a radio resource control message that includes the information.

In a ninth aspect, alone or in combination with one or more of the first through eighth aspects, process 1100 includes receiving an indication that the relay UE is to use the select mini-slot or the select sub-band for transmitting the packet, wherein each mini-slot of a plurality of mini-slots and each sub-band of the plurality of sub-bands is configured to be used by select UEs of a plurality of UEs.

In a tenth aspect, alone or in combination with one or more of the first through ninth aspects, process 1100 includes obtaining a bitmap that indicates that the relay UE is to use the select mini-slot or the select sub-band for transmitting the packet.

In an eleventh aspect, alone or in combination with one or more of the first through tenth aspects, the bitmap indicates a type of relaying that is to be used by the relay UE for transmitting the packet.

In a twelfth aspect, alone or in combination with one or more of the first through eleventh aspects, process 1100 includes selecting a packet, from a plurality of packets associated with a plurality of respective source nodes, that is to be transmitted in a transport block based at least in part on a logical channel group priority, a remaining packet delay budget, or a priority indicator that is included in sidelink control information.

In a thirteenth aspect, alone or in combination with one or more of the first through twelfth aspects, process 1100 includes receiving sidelink control information that indicates for the relay UE to transmit the packet in the select mini-slot or the select sub-band.

In a fourteenth aspect, alone or in combination with one or more of the first through thirteenth aspects, the relay UE and one or more other UEs are assigned respective fixed mini-slots or fixed slots for performing transmissions.

In a fifteenth aspect, alone or in combination with one or more of the first through fourteenth aspects, process 1100 includes receiving a wake-up signal, downlink control information, sidelink control information, a medium access control message, or a radio resource control message that indicates a fixed mini-slot or a fixed slot to be used by the relay UE for performing transmissions.

In a sixteenth aspect, alone or in combination with one or more of the first through fifteenth aspects, process 1100 includes receiving an indication of one or more time resources and one or more frequency resources for transmitting the packet, and performing multiple transmissions of the packet within the one or more time resources and the one or more frequency resources.

In a seventeenth aspect, alone or in combination with one or more of the first through sixteenth aspects, the one or more time resources include one or more orthogonal frequency division multiplexing symbols and the one or more frequency resources include at least one of a resource element, a resource block, or a sub-channel.

In an eighteenth aspect, alone or in combination with one or more of the first through seventeenth aspects, the relay UE is configured to perform the multiple transmissions of the packet using a first comb associated with the one or more time resources and the one or more frequency resources, and another UE is configured to perform one or more other transmissions using a second comb associated with the one or more time resources and the one or more frequency resources.

In a nineteenth aspect, alone or in combination with one or more of the first through eighteenth aspects, identifying the select mini-slot or the select sub-band for transmitting the packet comprises selecting a grid or a portion of a grid to be used for transmitting the packet.

In a twentieth aspect, alone or in combination with one or more of the first through nineteenth aspects, the grid or the portion of the grid to be used for transmitting the packet is different from a grid or a portion of a grid used for receiving the packet.

In a twenty-first aspect, alone or in combination with one or more of the first through twentieth aspects, process 1100 includes repeating or encoding a portion of data associated with the packet within the select mini-slot or the select sub-band, wherein transmitting the packet comprises performing a decode- and forward-operation.

In a twenty-second aspect, alone or in combination with one or more of the first through twenty-first aspects, process 1100 includes repeating a resource element transmission of the packet until a sub-band allocation is complete, wherein transmitting the packet comprises performing an amplify- and forward-operation.

In a twenty-third aspect, alone or in combination with one or more of the first through twenty-second aspects, identifying the select mini-slot or the select sub-band for transmitting the packet comprises selecting a mini-slot or a sub-band based at least in part on an allocated frequency domain dimension or an allocated time domain dimension.

In a twenty-fourth aspect, alone or in combination with one or more of the first through twenty-third aspects, both the allocated frequency domain dimension and the allocated time domain dimension include a demodulation reference signal symbol or a demodulation reference signal tone.

In a twenty-fifth aspect, alone or in combination with one or more of the first through twenty-fourth aspects, process 1100 includes receiving first stage sidelink control information that includes a source node identifier, a final destination node identifier, and at least one of a next destination node identifier or a group identifier.

In a twenty-sixth aspect, alone or in combination with one or more of the first through twenty-fifth aspects, process 1100 includes receiving first stage sidelink control information that includes a source node identifier and a final destination node identifier.

In a twenty-seventh aspect, alone or in combination with one or more of the first through twenty-sixth aspects, process 1100 includes receiving first stage sidelink control information that includes a source node identifier and at least one of a next destination node identifier or a group identifier, and receiving second stage sidelink control information that includes a final destination node identifier.

In a twenty-eighth aspect, alone or in combination with one or more of the first through twenty-seventh aspects, process 1100 includes receiving first stage sidelink control information that includes a source node identifier and a final destination node identifier, and receiving second stage sidelink control information that includes at least one of a next destination node identifier or a group identifier.

In a twenty-ninth aspect, alone or in combination with one or more of the first through twenty-eighth aspects, the source node is a UE and the destination node is another UE.

In a thirtieth aspect, alone or in combination with one or more of the first through twenty-ninth aspects, the source node is a UE or a network node and the destination node is another of the UE or the network node.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
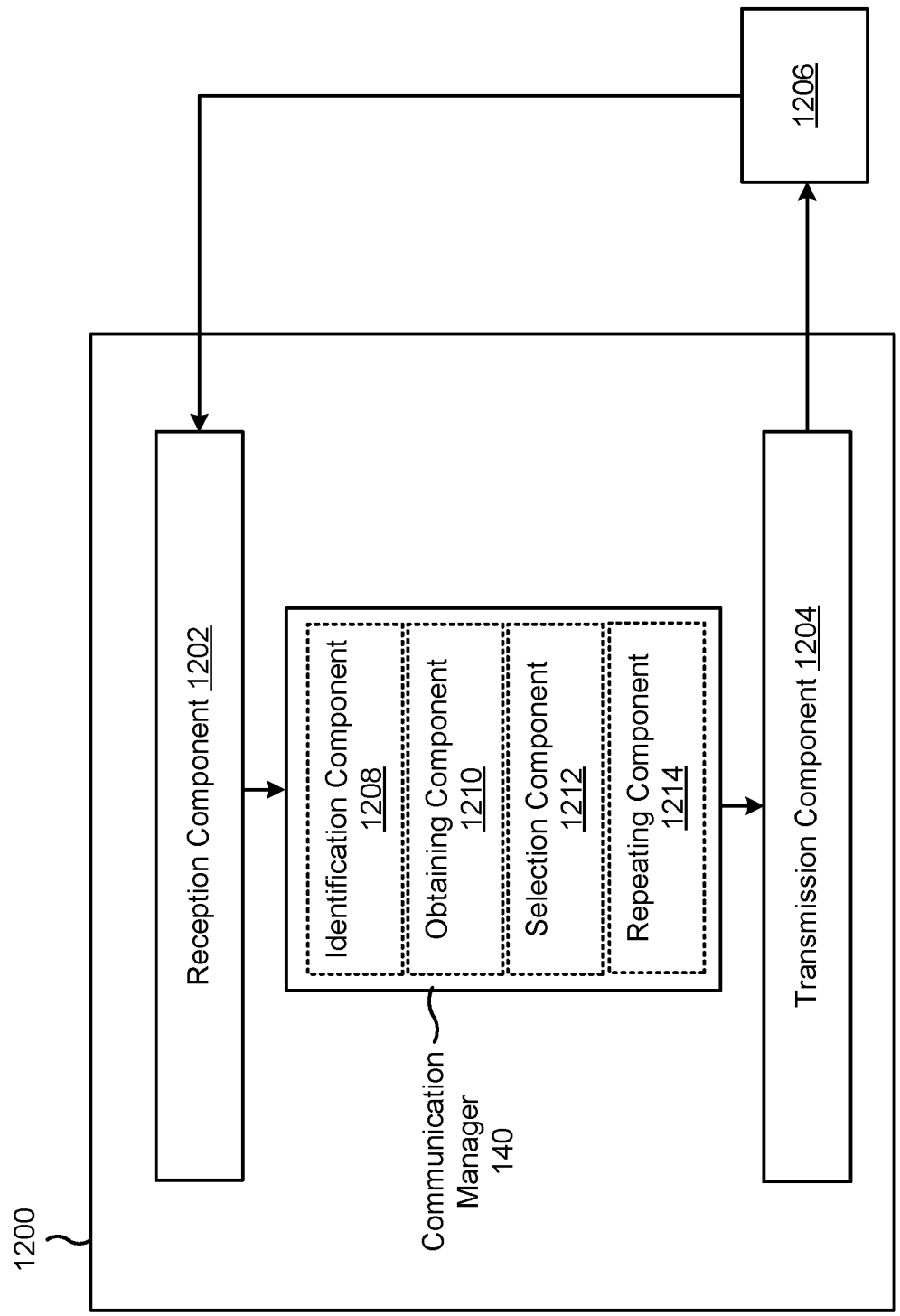
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a relay UE, or a relay UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of an identification component 1208, an obtaining component 1210, a selection component 1212, or a repeating component 1214, among other examples.

In some aspects, the apparatus 1200 may be configured to perform one or more operations described herein in connection with FIGS. 7-10. Additionally, or alternatively, the apparatus 1200 may be configured to perform one or more processes described herein, such as process 1100 of FIG. 11. In some aspects, the apparatus 1200 and/or one or more components shown in FIG. 12 may include one or more components of the relay UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the relay UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the relay UE described in connection with FIG. 2. In some aspects, the transmission component 1204 may be co-located with the reception component 1202 in a transceiver.

The reception component 1202 may receive a packet from a source node. The identification component 1208 may identify a select mini-slot or a select sub-band for transmitting the packet based at least in part on a reference signal measurement that is indicated per mini-slot of a plurality of mini-slots or per sub-band of a plurality of sub-bands. The transmission component 1204 may transmit the packet to a destination node using the select mini-slot or the select sub-band.

The reception component 1202 may receive information from the destination node that indicates which mini-slot of the plurality of mini-slots or which sub-band of the plurality of sub-bands is to be used for transmitting the packet. The reception component 1202 may receive an indication that the relay UE is to use the select mini-slot or the select sub-band for transmitting the packet, wherein each mini-slot of a plurality of mini-slots and each sub-band of the plurality of sub-bands is configured to be used by select UEs of a plurality of UEs. The obtaining component 1210 may obtain a bitmap that indicates that the relay UE is to use the select mini-slot or the select sub-band for transmitting the packet. The selection component 1212 may select a packet, from a plurality of packets associated with a plurality of respective source nodes, that is to be transmitted in a transport block based at least in part on a logical channel group priority, a remaining packet delay budget, or a priority indicator that is included in sidelink control information.

The reception component 1202 may receive sidelink control information that indicates for the relay UE to transmit the packet in the select mini-slot or the select sub-band. The reception component 1202 may receive a wake-up signal, downlink control information, sidelink control information, a medium access control message, or a radio resource control message that indicates a fixed mini-slot or a fixed slot to be used by the relay UE for performing transmissions. The reception component 1202 may receive an indication of one or more time resources and one or more frequency resources for transmitting the packet, and performing multiple transmissions of the packet within the one or more time resources and the one or more frequency resources. The repeating component 1214 may repeat or encoding a portion of data associated with the packet within the select mini-slot or the select sub-band, wherein transmitting the packet comprises performing a decode- and forward-operation. The repeating component 1214 may repeat a resource element transmission of the packet until a sub-band allocation is complete, wherein transmitting the packet comprises performing an amplify- and forward-operation.

The reception component 1202 may receive first stage sidelink control information that includes a source node identifier, a final destination node identifier, and at least one of a next destination node identifier or a group identifier. The reception component 1202 may receive first stage sidelink control information that includes a source node identifier and a final destination node identifier. The reception component 1202 may receive first stage sidelink control information that includes a source node identifier and at least one of a next destination node identifier or a group identifier, and receiving second stage sidelink control information that includes a final destination node identifier. The reception component 1202 may receive first stage sidelink control information that includes a source node identifier and a final destination node identifier, and receiving second stage sidelink control information that includes at least one of a next destination node identifier or a group identifier.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a relay user equipment (UE), comprising: receiving a packet from a source node; identifying a select mini-slot or a select sub-band for transmitting the packet based at least in part on a reference signal measurement that is indicated per mini-slot of a plurality of mini-slots or per sub-band of a plurality of sub-bands; and transmitting the packet to a destination node using the select mini-slot or the select sub-band.

Aspect 2: The method of Aspect 1, wherein a reference signal associated with the reference signal measurement is a channel state reference signal that is communicated by the relay UE before associated data or a demodulation reference signal, or is associated with a channel state reference signal that is multiplexed with the associated data or the demodulation reference signal.

Aspect 3: The method of Aspect 2, wherein the channel state reference signal that is communicated by the relay UE is received by the relay UE via a sidelink interface or a radio link interface or is transmitted by the relay UE via the sidelink interface or the radio link interface.

Aspect 4: The method of any of Aspects 1-3, wherein receiving the packet from the source node comprises receiving the packet via a different mini-slot than the select mini-slot used for transmitting the packet or receiving the packet via a different sub-band than the select sub-band used for transmitting the packet.

Aspect 5: The method of any of Aspects 1-4, wherein the reference signal measurement includes a reference signal received power measurement, a reference signal received quality measurement, channel state information, or channel quality information associated with a previous mini-slot transmission or a previous sub-band transmission.

Aspect 6: The method of any of Aspects 1-5, wherein the reference signal measurement is based at least in part on a reference signal that is communicated between the source node and the relay UE or a reference signal that is communicated between the relay UE and the destination node.

Aspect 7: The method of any of Aspects 1-6, wherein transmitting the packet to the destination node comprises performing an amplify-and-forward operation or a decode-and-forward operation.

Aspect 8: The method of any of Aspects 1-7, further comprising receiving information from the destination node that indicates which mini-slot of the plurality of mini-slots or which sub-band of the plurality of sub-bands is to be used for transmitting the packet.

Aspect 9: The method of Aspect 8, wherein receiving the information from the destination node comprises receiving downlink control information, a medium access control message, or a radio resource control message that includes the information.

Aspect 10: The method of any of Aspects 1-9, further comprising receiving an indication that the relay UE is to use the select mini-slot or the select sub-band for transmitting the packet, wherein each mini-slot of a plurality of mini-slots and each sub-band of the plurality of sub-bands is configured to be used by select UEs of a plurality of UEs.

Aspect 11: The method of any of Aspects 1-10, further comprising obtaining a bitmap that indicates that the relay UE is to use the select mini-slot or the select sub-band for transmitting the packet.

Aspect 12: The method of Aspect 11, wherein the bitmap indicates a type of relaying that is to be used by the relay UE for transmitting the packet.

Aspect 13: The method of any of Aspects 1-12, further comprising selecting a packet, from a plurality of packets associated with a plurality of respective source nodes, that is to be transmitted in a transport block based at least in part on a logical channel group priority, a remaining packet delay budget, or a priority indicator that is included in sidelink control information.

Aspect 14: The method of any of Aspects 1-13, further comprising receiving sidelink control information that indicates for the relay UE to transmit the packet in the select mini-slot or the select sub-band.

Aspect 15: The method of any of Aspects 1-14, wherein the relay UE and one or more other UEs are assigned respective fixed mini-slots or fixed slots for performing transmissions.

Aspect 16: The method of Aspect 15, further comprising receiving a wake-up signal, downlink control information, sidelink control information, a medium access control message, or a radio resource control message that indicates a fixed mini-slot or a fixed slot to be used by the relay UE for performing transmissions.

Aspect 17: The method of any of Aspects 1-16, further comprising receiving an indication of one or more time resources and one or more frequency resources for transmitting the packet, and performing multiple transmissions of the packet within the one or more time resources and the one or more frequency resources.

Aspect 18: The method of Aspect 17, wherein the one or more time resources include one or more orthogonal frequency division multiplexing symbols and the one or more frequency resources include at least one of a resource element, a resource block, or a sub-channel.

Aspect 19: The method of Aspect 17, wherein the relay UE is configured to perform the multiple transmissions of the packet using a first comb associated with the one or more time resources and the one or more frequency resources, and another UE is configured to perform one or more other transmissions using a second comb associated with the one or more time resources and the one or more frequency resources.

Aspect 20: The method of any of Aspects 1-19, wherein identifying the select mini-slot or the select sub-band for transmitting the packet comprises selecting a grid or a portion of a grid to be used for transmitting the packet.

Aspect 21: The method of Aspect 20, wherein the grid or the portion of the grid to be used for transmitting the packet is different from a grid or a portion of a grid used for receiving the packet.

Aspect 22: The method of any of Aspects 1-21, further comprising repeating or encoding a portion of data associated with the packet within the select mini-slot or the select sub-band, wherein transmitting the packet comprises performing a decode- and forward-operation.

Aspect 23: The method of any of Aspects 1-22, further comprising repeating a resource element transmission of the packet until a sub-band allocation is complete, wherein transmitting the packet comprises performing an amplify- and forward-operation.

Aspect 24: The method of any of Aspects 1-23, wherein identifying the select mini-slot or the select sub-band for transmitting the packet comprises selecting a mini-slot or a sub-band based at least in part on an allocated frequency domain dimension or an allocated time domain dimension.

Aspect 25: The method of Aspect 24, wherein both the allocated frequency domain dimension and the allocated time domain dimension include a demodulation reference signal symbol or a demodulation reference signal tone.

Aspect 26: The method of any of Aspects 1-25, further comprising receiving first stage sidelink control information that includes a source node identifier, a final destination node identifier, and at least one of a next destination node identifier or a group identifier.

Aspect 27: The method of any of Aspects 1-25, further comprising receiving first stage sidelink control information that includes a source node identifier and a final destination node identifier.

Aspect 28: The method of any of Aspects 1-25, further comprising receiving first stage sidelink control information that includes a source node identifier and at least one of a next destination node identifier or a group identifier, and receiving second stage sidelink control information that includes a final destination node identifier.

Aspect 29: The method of any of Aspects 1-25, further comprising receiving first stage sidelink control information that includes a source node identifier and a final destination node identifier, and receiving second stage sidelink control information that includes at least one of a next destination node identifier or a group identifier.

Aspect 30: The method of any of Aspects 1-29, wherein the source node is a UE and the destination node is another UE.

Aspect 31: The method of any of Aspects 1-29, wherein the source node is a UE or a network node and the destination node is another of the UE or the network node.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A relay user equipment (UE) for wireless communication, comprising:
a memory; and
one or more processors coupled with the memory and configured to cause the relay UE to:
receive a packet from a source node;
identify a select mini-slot or a select sub-band for transmitting the packet based at least in part on a reference signal measurement that is indicated per mini-slot of a plurality of mini-slots or per sub-band of a plurality of sub-bands; and
transmit the packet to a destination node using the select mini-slot or the select sub-band.

2. The relay UE of claim 1, wherein the one or more processors are further configured to identify another select mini-slot or another select sub-band for receiving the packet based at least in part on the reference signal measurement or another reference signal measurement that is indicated per mini-slot of a plurality of mini-slots or per sub-band of a plurality of sub-bands.

3. The relay UE of claim 2, wherein the select mini-slot is the same as the other select mini-slot, or the select sub-band is the same as the other sub-band.

4. The relay UE of claim 2, wherein the select mini-slot is different than the other select mini-slot, or the select sub-band is different than the other select sub-band.

5. The relay UE of claim 2, wherein the select mini-slot and the other select mini-slot occupy the same slot, or the select sub-band and the other select sub-band occupy the same sub-band.

6. The relay UE of claim 2, wherein the select mini-slot and the other select mini-slot occupy different slots, or the select sub-band and the other select sub-band occupy different sub-bands.

7. The relay UE of claim 1, wherein a reference signal associated with the reference signal measurement is a channel state reference signal that is communicated by the relay UE before associated data or a demodulation reference signal, or is associated with a channel state reference signal that is multiplexed with the associated data or the demodulation reference signal.

8. The relay UE of claim 7, wherein the channel state reference signal that is communicated by the relay UE is received by the relay UE via a sidelink interface or a radio link interface or is transmitted by the relay UE via the sidelink interface or the radio link interface.

9. The relay UE of claim 1, wherein the one or more processors, to receive the packet from the source node, are configured to receive the packet via a different mini-slot than the select mini-slot used for transmitting the packet or receive the packet via a different sub-band than the select sub-band used for transmitting the packet.

10. The relay UE of claim 1, wherein the reference signal measurement includes a reference signal received power measurement, a reference signal received quality measurement, channel state information, or channel quality information associated with a previous mini-slot transmission or a previous sub-band transmission.

11. The relay UE of claim 1, wherein the one or more processors, to transmit the packet to the destination node, are configured to perform an amplify-and-forward operation or a decode-and-forward operation.

12. The relay UE of claim 1, wherein the one or more processors are further configured to receive information from the destination node that indicates which mini-slot of the plurality of mini-slots or which sub-band of the plurality of sub-bands is to be used for transmitting the packet.

13. The relay UE of claim 1, wherein the one or more processors are further configured to receive an indication that the relay UE is to use the select mini-slot or the select sub-band for transmitting the packet, wherein each mini-slot of a plurality of mini-slots and each sub-band of the plurality of sub-bands is configured to be used by select UEs of a plurality of UEs.

14. The relay UE of claim 1, wherein the one or more processors are further configured to obtain a bitmap that indicates that the relay UE is to use the select mini-slot or the select sub-band for transmitting the packet.

15. The relay UE of claim 14, wherein the bitmap indicates a type of relaying that is to be used by the relay UE for transmitting the packet.

16. The relay UE of claim 1, wherein the one or more processors are further configured to select a packet, from a plurality of packets associated with a plurality of respective source nodes, that is to be transmitted in a transport block based at least in part on a logical channel group priority, a remaining packet delay budget, or a priority indicator that is included in sidelink control information.

17. The relay UE of claim 1, wherein the one or more processors are further configured to receive sidelink control information that indicates for the relay UE to transmit the packet in the select mini-slot or the select sub-band.

18. The relay UE of claim 1, wherein the relay UE and one or more other UEs are assigned respective fixed mini-slots or fixed slots for performing transmissions.

19. The relay UE of claim 18, wherein the one or more processors are further configured to receive a wake-up signal, downlink control information, sidelink control information, a medium access control message, or a radio resource control message that indicates a fixed mini-slot or a fixed slot to be used by the relay UE for performing transmissions.

20. The relay UE of claim 1, wherein the one or more processors are further configured to receive an indication of one or more time resources and one or more frequency resources for transmitting the packet, and perform multiple transmissions of the packet within the one or more time resources and the one or more frequency resources.

21. The relay UE of claim 20, wherein the one or more processors are further configured to perform the multiple transmissions of the packet using a first comb associated with the one or more time resources and the one or more frequency resources, and another UE is configured to perform one or more other transmissions using a second comb associated with the one or more time resources and the one or more frequency resources.

22. The relay UE of claim 1, wherein the one or more processors, to identify the select mini-slot or the select sub-band for transmitting the packet, are configured to select a grid or a portion of a grid to be used for transmitting the packet.

23. The relay UE of claim 22, wherein the grid or the portion of the grid to be used for transmitting the packet is different from a grid or a portion of a grid used for receiving the packet.

24. The relay UE of claim 1, wherein the one or more processors are further configured to repeat or encoding a portion of data associated with the packet within the select mini-slot or the select sub-band, wherein transmitting the packet comprises performing a decode- and forward-operation.

25. The relay UE of claim 1, wherein the one or more processors are further configured to repeat a resource element transmission of the packet until a sub-band allocation is complete, wherein transmitting the packet comprises performing an amplify- and forward-operation.

26. The relay UE of claim 1, wherein the one or more processors, to identify the select mini-slot or the select sub-band for transmitting the packet, are configured to select a mini-slot or a sub-band based at least in part on an allocated frequency domain dimension or an allocated time domain dimension.

27. The relay UE of claim 1, wherein the one or more processors are further configured to:
  receive first stage sidelink control information that includes a source node identifier, a final destination node identifier, and at least one of a next destination node identifier or a group identifier;
  receive first stage sidelink control information that includes a source node identifier and a final destination node identifier;
  receive first stage sidelink control information that includes a source node identifier and at least one of a next destination node identifier or a group identifier, and receive second stage sidelink control information that includes a final destination node identifier; or
  receive first stage sidelink control information that includes a source node identifier and a final destination node identifier, and receive second stage sidelink control information that includes at least one of a next destination node identifier or a group identifier.

28. A method of wireless communication performed by a relay user equipment (UE), comprising:
  receiving a packet from a source node;
  identifying a select mini-slot or a select sub-band for transmitting the packet based at least in part on a reference signal measurement that is indicated per mini-slot of a plurality of mini-slots or per sub-band of a plurality of sub-bands; and
  transmitting the packet to a destination node using the select mini-slot or the select sub-band.

29. A non-transitory computer-readable medium storing a set of instructions for wireless communication, the set of instructions comprising:
  one or more instructions that, when executed by one or more processors of a relay user equipment (UE), cause the UE to:
    receive a packet from a source node;
    identify a select mini-slot or a select sub-band for transmitting the packet based at least in part on a reference signal measurement that is indicated per mini-slot of a plurality of mini-slots or per sub-band of a plurality of sub-bands; and
    transmit the packet to a destination node using the select mini-slot or the select sub-band.

30. An apparatus for wireless communication, comprising:
  means for receiving a packet from a source node;
  means for identifying a select mini-slot or a select sub-band for transmitting the packet based at least in part on a reference signal measurement that is indicated per mini-slot of a plurality of mini-slots or per sub-band of a plurality of sub-bands; and
  means for transmitting the packet to a destination node using the select mini-slot or the select sub-band.

* * * * *